Oct. 23, 1951 L. D. JOHNSON 2,572,348
PORTABLE PALLET MOUNTING STRUCTURE
Filed Nov. 22, 1948 2 SHEETS—SHEET 1
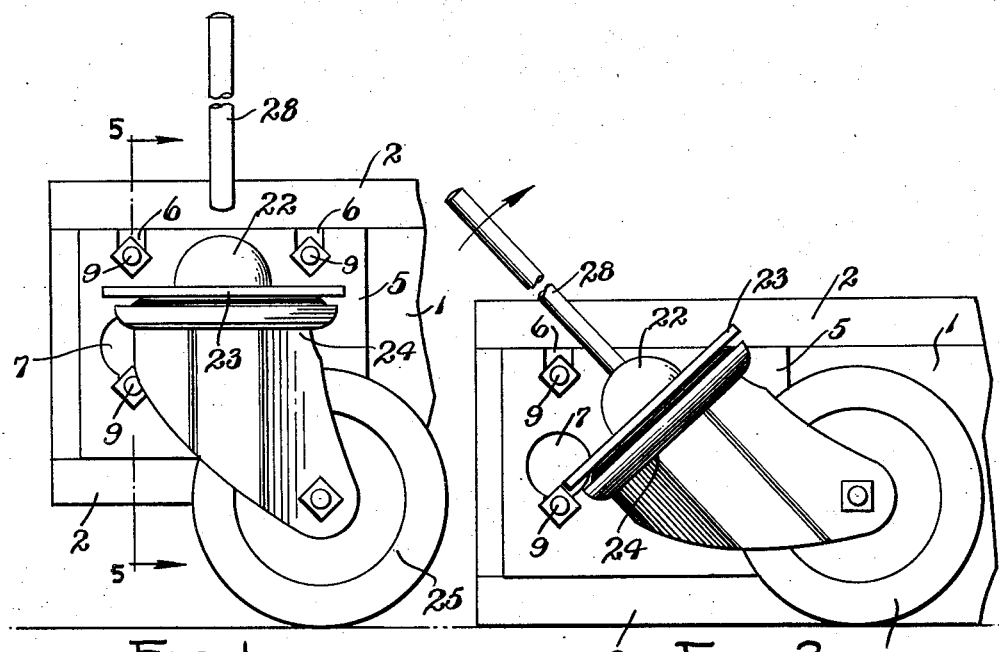
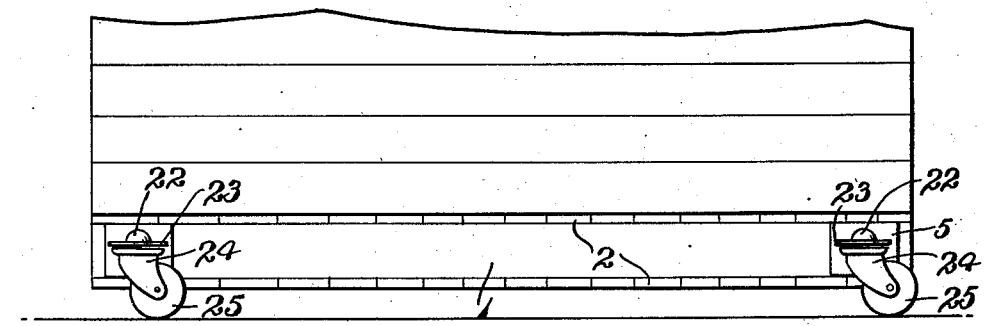
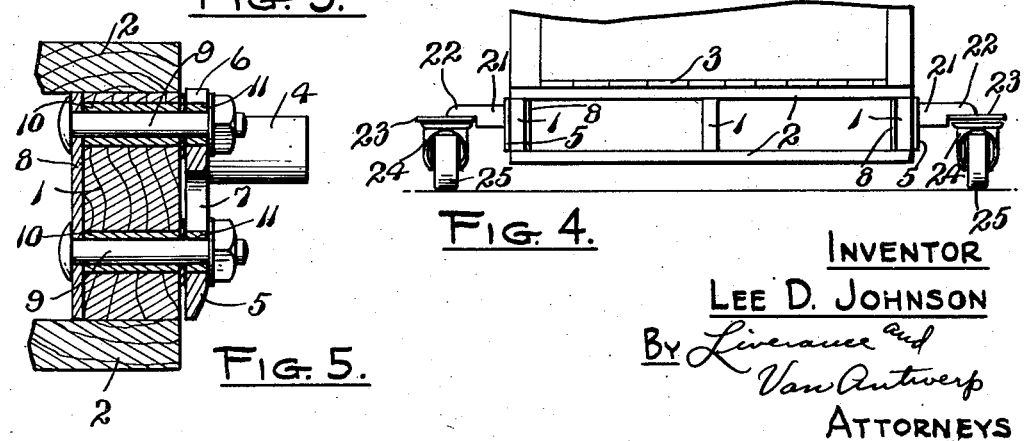
INVENTOR
LEE D. JOHNSON
BY Liverance and
Van Antwerp
ATTORNEYS Oct. 23, 1951  L. D. JOHNSON  2,572,348
PORTABLE PALLET MOUNTING STRUCTURE
Filed Nov. 22, 1948

INVENTOR
LEE D. JOHNSON
BY Liverance and
Van Antwerp
ATTORNEYS

Patented Oct. 23, 1951

2,572,348

UNITED STATES PATENT OFFICE 2,572,348

PORTABLE PALLET MOUNTING STRUCTURE

Lee D. Johnson, Almont, Mich.

Application November 22, 1948, Serial No. 61,463

5 Claims. (Cl. 280—43)

This invention relates to a pallet mounting.

Pallets upon which articles may be carried, many times stacked thereon to considerable heights so that the total weight of the load is large, are in extensive use in factories and other places in connection with the processes of machining, and in transporting the articles to be machined from one place to another around factories; and in larger transportation from one city to another. Such pallets heretofore have rested upon the floor and are built so that small factory trucks with elevating forks thereon at the fronts of the trucks may be used, the fork being engaged with a pallet and the pallet with the articles thereon elevated the necessary distance and thereupon the truck moved from one place to another, either in factories or to and from trucks and railway cars. Frequently the distance of moving is short. Under such circumstances time is lost in getting a truck for the purpose of moving, the use of which in actually moving may take only a few seconds.

It is a primary object and purpose of the present invention to provide a mounting for the pallets which may be operated to lift the pallet above the floor and in such lifting make it caster mounted whereby the truck and the articles on it are readily pushed by hand short distances without the necessity of using a factory truck for moving. Said caster mounts for the pallet are detachable. In addition with my invention, the caster mounts are manually turned from a position in which the pallet rests upon the floor of the factory or on the floor of a car or truck when articles are to be shipped or transported long distances to easy moving position and back again. Said casters in operative position are very useful for moving the pallets and the articles carried thereby to desired locations in a car or truck so as to get the greatest use of the space available. Likewise in unloading, the pallets with the casters in operative moving position may be pushed over the floor of the car and over the toe board from the car to the loading platform prior to the engagement thereof with the fork trucks which are used to elevate them and carry them longer distances. After they have been moved by the forked trucks to desired places in the warehouse, and moved by hand to their places of storage in the warehouse, the caster mounts are removed with the pallets resting upon the floor of the warehouse. The detachability of the caster mounts from the pallets permits the use of a relatively few of the caster mounts with many more pallets so that each pallet is not required to be equipped with a caster mounting, but the detachable caster mountings are applicable to all of the pallets and may be used over and over again with many different pallets.

It is a primary object and purpose of the present invention to provide a novel, simple and very efficient and useful mounting for pallets, of a sturdy and durable structure, for attaining the advantages and functions stated, as well as many others not at this time enumerated, but which will appear and be understood from the following description, taken in connection with the accompanying drawings, in which:

Fig. 1 is a fragmentary side elevation of a pallet at a corner thereof, each pallet adjacent each corner thereof being adapted to have one of the caster mountings of my invention applied thereto.

Fig. 2 is a similar fragmentary elevation showing the caster mounted in its inoperative position and with pallet lowered to the floor, Fig. 1 showing the caster in operative position with the pallet raised above the floor.

Fig. 3 is a side elevation of the pallet, showing two of the caster mounts, one adjacent each corner of the pallet.

Fig. 4 is an end elevation of the structure shown in Fig. 3.

Fig. 5 is a vertical section, substantially on the plane of line 5—5 of Fig. 1, with the caster removed.

Like reference characters refer to like parts in the different figures of the drawing.

Figure 8:
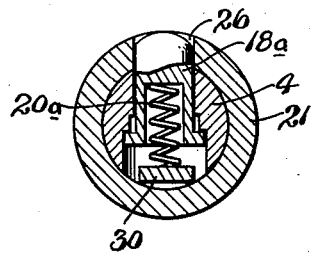
Fig. 8 is a transverse vertical section illustrating a modified form of releasable latching means for detachably securing the caster to the shaft upon which it is adjustably mounted.
Figure 7:
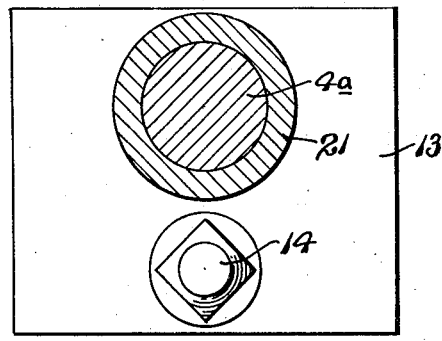
Fig. 7 is a transverse vertical section substantially on the plane of line 7—7 of Fig. 6.

The pallet, generally of rectangular form, is shown as of conventional structure, having two outer sills and an intermediate sill 1. The sills are connected in spaced apart relation by upper and lower boards 2 extending across the upper and lower edges thereof and permanently secured, and the upper boards may be covered by a series of other boards 3, the length of which is at right angles to the length of the upper boards 2 and nailed, screwed, or otherwise permanently secured in place. The pallet may have vertical sides and ends secured in place to provide a receptacle for receiving articles; or the pallet may dispense with such vertical sides and ends and have the articles stacked one over the other in the many ways which are now used. Such pallets provide spaces lengthwise thereof between the sills 1 and above the lower boards 2 and below the upper boards 2 for the entrance of the forks of forked factory trucks, which forks may be elevated to lift the pallet and the articles thereon when movement is to be made from one place to another.

In one form or embodiment of my invention a cylindrical rod or shaft 4 of short length is welded or otherwise permanently secured to a rectangular plate 5 of heavy flat metal. The plate 5 in its upper edge has two downwardly extending spaced short slots 6 therein. Below each of the slots 6 a keyhole slot 7 is made through the plate. The lower end portions of the keyhole slots 7 are substantially of the same dimensions as the upper slots 6.

A rectangular plate 8, of less thickness than the plate 5, is located at the inner side of each of the outer sills 1 near each end thereof. Four bolts 9 pass through openings in the plate 8 and also through sleeves 10 which are housed in transverse openings in the sills 1, the sleeves 10 being of a length equal to the thickness of the sills. Short collars 11 are around the bolts at the outer side of the sills 1 between washers, as shown, and each of the bolts at its outer end receives a nut. The nuts are tightened against the outer washer which forces the collars 11 against the inner washers which in turn are forced against the outer ends of the sleeves 10. This provides a mounting structure for the plates 5 by passing the nuts of the lower bolts 9 through the upper portions of the keyhole slots 1, the plate 5 upon being moved upward after thus positioned having the lower ends of the keyhole slots 7 and the upper slots 6 receiving the collars 11. In this manner the plates 5 are detachably connected, one adjacent each corner and two at each outer side of each pallet.

The bolts 9, plate 8, sleeves 10 and collars 11 with associated washers and nuts are permanent attachments to each pallet, adjacent the four corners thereof. It is on the short shafts 4 that the casters for the pallet are detachably mounted. The plates 5 with the connected shafts 4 are removable so that the pallets after being moved to a desired position in a warehouse or during shipment after being moved to proper position in a car or truck, are removed. When the pallets and the articles reach their destination, other plates 5 having shafts 4, upon the shafts of which casters are carried, are used at the destination for handling the pallets.

Figure 6:
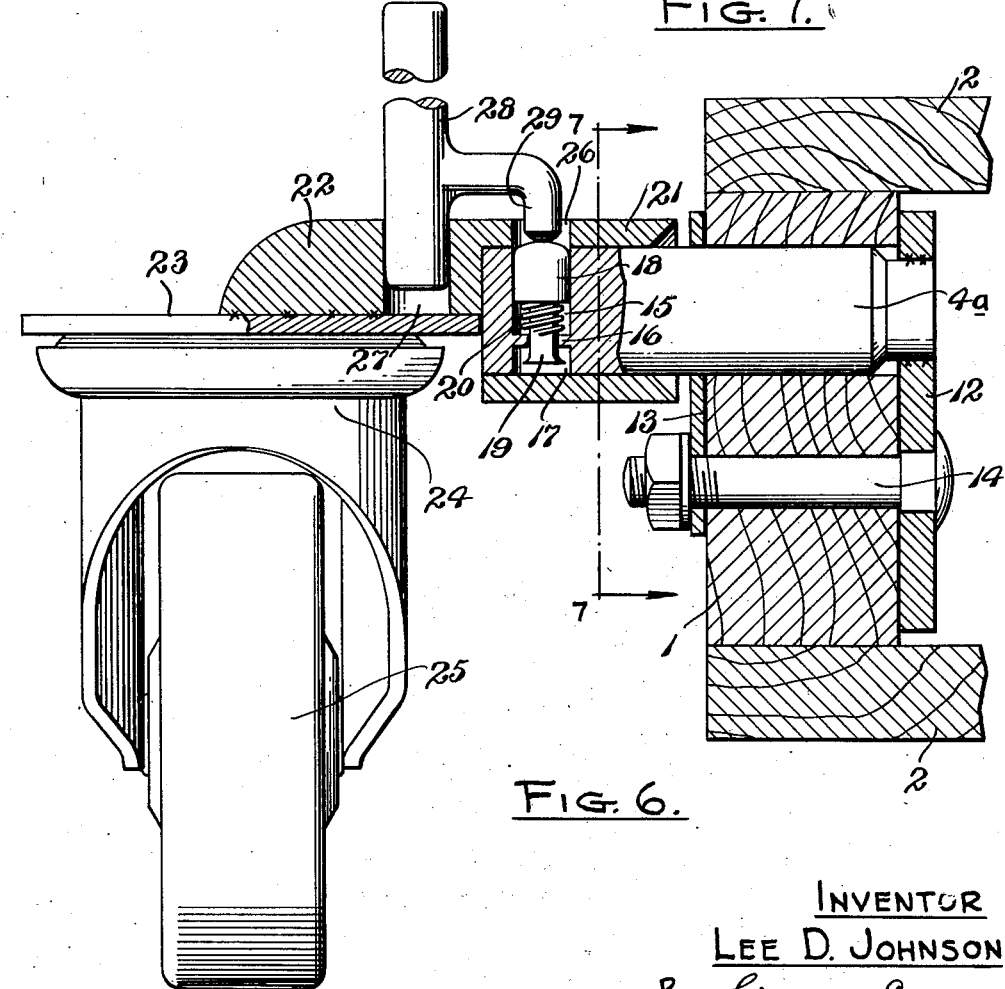
Fig. 6 is a fragmentary enlarged vertical section through a pallet mounting of a different specific form of construction than that shown in Figs. 1 to 5 inclusive, illustrating the manner in which the caster is detached from the shaft on which it is adjustably mounted.

In Fig. 6, a relatively heavy plate 12 is located at the inner side and near each end of each of the outer sills 1, and a smaller and lighter plate 13 at the outer side thereof. The shaft 4a is welded to the plate 12 and extends through the sill 1 and through an opening in the plate 13, at its outer end it is spaced from the outer side of the plate 13 substantially the same distance that the shaft 4 in Fig. 5 is from the outer side of the plate 5. A bolt 14 below the shaft 4a passes through both plates 12 and 13 and the sill 1. This provides a slightly different but exactly equivalent means for carrying the casters which are to be mounted upon shafts 4 or 4a. The permanent attachments for the pallet in Fig. 6 include the shafts 4a while in the structure shown in Fig. 5, the shafts 4 and the plates to which connected are detachable. When the pallet is supplied with permanent attachments, as in Fig. 6, the shafts 4a will project outwardly from the adjacent sides of the sills 1, while in the first described structure such projecting shafts are not on the pallets except during the time that the caster mountings for the pallets are to be used.

Near the free end of the shafts 4 and 4a, a diametrically located recess 15 is drilled or otherwise provided part way through the shaft, separated by a partition 16 from an aligned shorter recess 17. A latching bolt 18 is located in the recess 15 and has a stem 19 passing through an opening in the partition 16. A spring 20 between the inner end of the bolt 18 and the partition 16 normally tends to move the latching bolt 18 outwardly until stopped by the upset end of the stem 19 coming against the partition.

The caster mounting includes a sleeve 21 from which a lug 22 projects at one end and at the upper portion of the sleeve. The lug 22 has a flat under side lying over and against the upper side of an upper plate 23 of a caster, said plate 23 and lug 22 having a permanent welded connection. An under forked part 24 of the caster is mounted to turn about a vertical axis and connected with the plate 23, a caster wheel 25 being mounted for turning on and between the sides of the fork 24.

The sleeve 21 has an inner diameter slightly greater than the exterior diameter of the shaft 4 or 4a and may be placed thereover as shown in Fig. 6, or as it is in Figs. 1 and 2, the outer end of the shaft 4 or 4a coming against the inner end of the lug 22. An opening 26 is made through a side of the sleeve 21 which when the caster extends vertically downward from the plate 23, is in position to receive the latching bolt 18 which enters the opening 26 and locks the sleeve to the shaft. The lug 22, at a short distance outward of the shaft 4 or 4a when located thereon, has an opening 27 in it the axis of which may parallel the axis of the opening 26 as shown in Fig. 6.

When the pallet rests on the floor as in Fig. 2 the latching bolt 18 will be out of alinement with the opening 26. A tool is provided consisting of an elongated rod 28 having an exterior diameter of such that at one end it freely enters the opening 27. Said tool also adjacent such end of the rod has a laterally extending finger 29 which, at its free end portion, is turned substantially at right angles, being spaced from the rod 28 the proper distance so that the end of the finger 29 may enter the opening 26 when the adjacent end of the rod 28 is inserted in the opening 27.

To lift the pallet from the floor the end of the rod 28 is inserted in the opening 27 with the finger 29 turned to a position away from that shown in Fig. 6 and generally at right angles to such position. Then by moving the rod 28 in a clockwise direction (Fig. 2), sleeve 21 is turned until the opening 26 comes to the bolt 18 which enters the opening. When such position is reached the caster is located vertically, as in Fig. 1, and the pallet has been lifted from the floor. The caster remains in its locked position and by operating all of the caster mounts which generally in practice will be four to each pallet, one at each corner thereof, the pallet is thereupon carried by the rollers 25 and may be readily pushed from one position to another.

When the pallet and the articles carried by it are to be lowered to the floor of a factory, warehouse, bottom of a freight car or a truck body, the described tool is positioned as in Fig. 6, so that on movement of the end of the rod 28 into the opening 27 the end of the finger 29 engages the latch bolt 18 and moves it inwardly against the spring 20. This unlocks the sleeve 21 from connection to the shaft 4 or 4a and the pallet may be lowered and the casters take an inclined position shown in Fig. 2. In such position the casters may be removed from the shaft 4a so that the pallet is left with the permanent attachments each consisting of the plates 12 and 13, shaft 4a and the rod 14, in the structure shown in Fig. 6.

In the structure shown in Fig. 2, the caster does not need to be removed from the shaft 4 as the plate 5, shaft 4 and the caster may be removed together from the permanent attachments secured one adjacent each corner of the pallet. If desired, a readily operable releasable latching means may be provided to secure the shaft 4 and a caster against accidental disconnection.

In Fig. 8 a somewhat different latching structure is used. The latching bolt 18a is of the same exterior dimensions as the bolt 18, but is longer and is interiorly bored axially a distance at its inner end for the projecting spring 20a. The recess in the shaft 4 in which the latching bolt is mounted extends through the shaft and is enlarged for the flange shown at the inner end of the bolt 18 and the spring 20a is bottomed at one end against the latching bolt 18a and at the other against a suitable fixed support 30 at an end of the latch bolt opening in shaft 4. The action is the same as in the first described structure, the two structures being equivalent in function and the way they are used and operated.

With the present invention the handling of pallets in factories, warehouses and in loading and unloading freight cars or trucks is greatly facilitated, with a marked time saving, and a consequent reduction in cost of shipping and machine operations. The pallets are readily moved by manual power short distances in the factory, as from one machine to another, or short distances after they have been carried at the factory on forks of loading trucks approximately to the places where they are to be positioned in a car or truck or in a warehouse, being thereafter moved to final location by hand. The detachable caster assemblies will be kept in stock at a factory and at a warehouse, being removed from the pallets when they, with the articles carried thereby above them are shipped by rail, truck or the like and used only during the times that the pallets and the loads thereon require moving short distances about the factory or short distances in cars, trucks and warehouses.

The invention has been illustrated in connection with pallets used in factories and in the shipment or transportation of machine parts which are used in manufacturing, but of course it is evident that the novel mounting which is shown may be used with many other devices. For example, it may be used in frames, racks, boxes, furniture, platforms, skids and the like or any other structure which it may be desired to move from one place to another and rest upon the floor or ground after a destination has been reached, whereupon the mounting may be removed and not reattached until a further movement is wanted. The invention which has proved very useful in conjunction with pallets is not restricted in use solely thereto, but is to be considered comprehensive of all forms of structure coming within the scope of the claims, wherever such structures may be used.

I claim:

1. In a structure as described, a horizontal pallet, attachments secured at opposite sides of the pallet, one near each end thereof permanently secured thereto, each including an outer plate lying against a side of the pallet, bolts passing through said plate for connecting the plate to the pallet, nuts on the outer end of the bolt, spacing collars between said nuts and said plate, one on each bolt, a second plate having spaced keyhole slots through it between its upper and lower edges and slots at the upper edge portions of the plate open at their upper ends, said slots in number being equal to the number of bolts for connection of the second plate with the bolts, said spacing collars entering the slots in said second plate, a short horizontal shaft permanently secured to said second plate extending outwardly therefrom upon which a caster assembly is adapted to be rockably mounted to occupy one position in which the pallet is lifted above a floor with caster rollers bearing against the floor, and in another position of which the casters are inclined at an angle with respect to the first position with the pallet lowered to rest upon said floor.

2. A structure as defined in claim 1, and a caster assembly for each shaft including a horizontal sleeve telescopingly receiving a shaft, a caster connected to said sleeve extending generally at right angles thereto, and releasable locking means for holding the sleeve in a fixed position with respect to its associated shaft with the pallet raised above the floor.

3. A horizontal rectangular pallet having a top, and downwardly extending side sills one at each side thereof to which the top is connected, a fixture secured to each sill of the pallet, one near each end thereof, each of said fixtures comprising an inner plate located at the inner side of its associated sill, an outer plate at the outer side of the sill, a short shaft permanently connected with the inner plate extending through said sill and outer plate and a bolt passing through said sill and through both plates, and a caster assembly rockably mounted on the shaft for turning to two positions, in one of which the pallet is elevated above the floor and in the other of which the pallet rests upon the floor.

4. In combination, a rectangular horizontal pallet, fixtures each including a short horizontal shaft attached to opposite sides of the pallet, one near each end thereof, a caster assembly for each shaft comprising a horizontal sleeve, slidable over said shaft, said sleeve having an outwardly extending integral lug, a caster permanently secured to said lug including a caster roller, latching means between each shaft and its associated sleeve for locking each sleeve to its associated shaft with the caster roller bearing upon a floor and lifting the pallet above the floor, said caster assembly upon release of the latching means turning about the horizontal axis of its associated shaft to an inclined position, the pallet being lowered and resting upon the floor, said latching means between a shaft and its associated sleeve comprising a spring actuated latching bolt carried by the shaft, said sleeve having an opening to receive it, and said lug having an opening paralleling the opening in the sleeve spaced a short distance therefrom, and a tool for operating said caster assembly comprising an elongated rod one end of which is adapted to be received in the last mentioned opening and a fork adjacent said end of the rod having an end portion parallel to the rod to enter the opening in the sleeve to push and retract the latch bolt inwardly.

5. In a structure as described, a horizontal pallet, attachments secured at opposite sides of the pallet, one near each end thereof permanently secured thereto, each including an outer plate lying against a side of the pallet, bolts passing through said plate for connecting the plate to the pallet, nuts on the outer end of the bolt, spacing collars between said nuts and said plate, one on each bolt, a second plate having spaced keyhole slots through it between its upper and lower edges and slots at the upper edge portions of the plate open at their upper ends, said slots in number being equal to the number of bolts for connection of the second plate with the bolts, said spacing collars entering the slots in said second plate, a short horizontal shaft permanently secured to said second plate extending outwardly therefrom upon which a caster assembly is adapted to be rockably mounted to occupy one position in which the pallet is lifted above a floor with caster rollers bearing against the floor, and in another position of which the casters are inclined at an angle with respect to the first position with the pallet lowered to rest upon said floor, and a caster assembly for each shaft including a horizontal sleeve telescopingly receiving a shaft, a caster connected to said sleeve extending generally at right angles thereto, and releasable locking means for holding the sleeve in a fixed position with respect to its associated shaft with the pallet raised above the floor.

LEE D. JOHNSON.

REFERENCES CITED

The following references are of record in the file of this patent:

UNITED STATES PATENTS

| Number | Name | Date |
|---|---|---|
| 706,209 | Sumner | Aug. 5, 1902 |
| 1,973,098 | Pride | Sept. 11, 1934 |
| 1,982,008 | Mandl | Nov. 27, 1934 |
| 2,190,081 | Pfauser | Feb. 13, 1940 |
| 2,446,518 | Arnold et al. | Aug. 10, 1948 |